United States Patent [19]
Gilliem

[11] Patent Number: 5,181,579
[45] Date of Patent: Jan. 26, 1993

[54] STEERING AND DRIVING SYSTEM

[75] Inventor: Donald L. Gilliem, W. Lafayette, Ind.

[73] Assignee: TRW Inc., Lyndhurst, Ohio

[21] Appl. No.: 686,672

[22] Filed: Apr. 17, 1991

[51] Int. Cl.$^5$ .............................................. B62D 11/00
[52] U.S. Cl. .................................. 180/6.48; 180/19.1; 180/19.2; 180/305; 180/308
[58] Field of Search ...................... 180/6.3, 6.48, 19.1, 180/19.2, 305, 308, 242

[56] References Cited

U.S. PATENT DOCUMENTS

| | | |
|---|---|---|
| 2,766,834 | 10/1956 | Boyer . |
| 3,233,691 | 2/1966 | De Biasi . |
| 3,234,856 | 2/1966 | Martin ............................ 180/6.48 X |
| 4,231,441 | 11/1980 | Burckhardt ....................... 180/6.48 |
| 4,321,980 | 3/1982 | Nissen ............................ 180/6.48 X |
| 4,920,733 | 5/1990 | Berrios . |

FOREIGN PATENT DOCUMENTS 1095422 12/1967 United Kingdom ............... 180/6.48

*Primary Examiner*—David H. Bollinger
*Attorney, Agent, or Firm*—Tarolli, Sundheim & Covell

[57] ABSTRACT

A first wheel positioned on a first side of a vehicle is driven by a first reversible hydraulic motor. A second wheel positioned on a second side of the vehicle is driven by a second reversible hydraulic motor. A first valve controls the drive direction and speed of operation of the first hydraulic motor. A second valve controls the drive direction and speed of operation of the second hydraulic motor. An actuator shaft is connected with the first and second valves. Linear movement of the actuator shaft along its axis actuates both of the valves in either a forward or a reverse direction. The actuator shaft is also rotatable about its axis. Rotation of the actuator shaft about its axis actuates one of the valves in the forward direction and the other of the valves in the reverse direction.

16 Claims, 8 Drawing Sheets

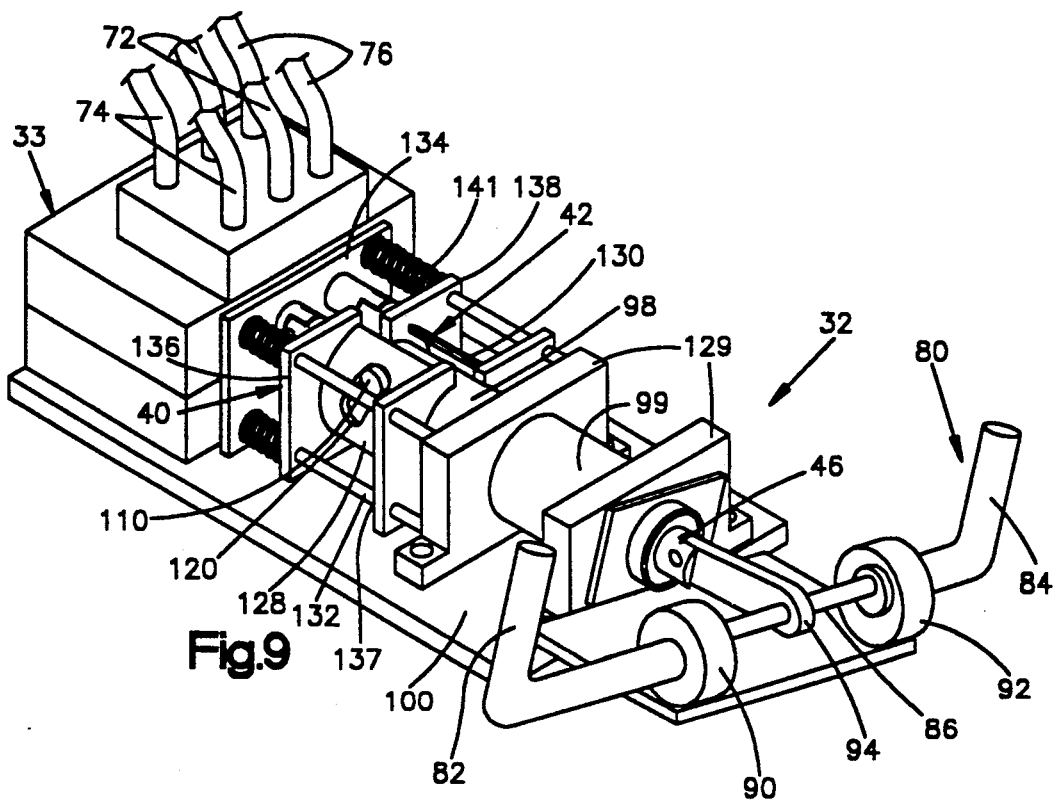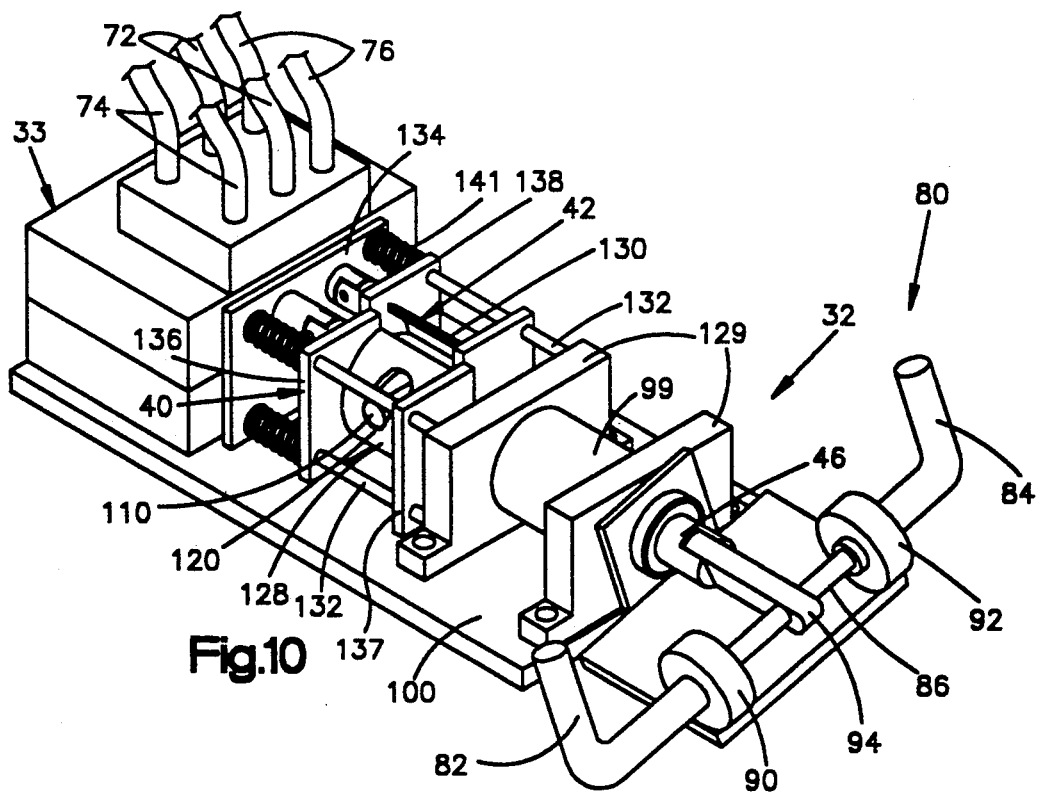

STEERING AND DRIVING SYSTEM

BACKGROUND OF THE INVENTION

The present invention relates to vehicle steering and, particularly, relates to a steering and drive control system for a vehicle.

U.S. Pat. No. 3,233,691 discloses a steering and drive control system for a vehicle. The system includes two hydraulic motors. The respective motors drive ground engaging members on opposite sides of the vehicle. The drive direction and speed of each motor is controlled by actuation of a manually controlled linkage.

To drive the vehicle disclosed in U.S. Pat. No. 3,233,691 in a forward direction, both hydraulic motors are actuated to drive the ground engaging members forward. To drive the vehicle in a reverse direction both hydraulic motors are actuated to drive the ground engaging members in reverse. To steer the vehicle, one hydraulic motor is actuated to drive its associated ground engaging member on one side of the vehicle in one direction, and the other hydraulic motor is actuated to drive its associated ground engaging member on the other side of the vehicle in the opposite direction. The manually controlled linkage includes a steering wheel which moves to pivot a shaft to actuate the hydraulic motors in either a forward or reverse direction. The steering wheel rotates to rotate the shaft to actuate the hydraulic motors in opposite directions for steering the vehicle.

SUMMARY OF THE INVENTION

The present invention provides a new and improved steering and drive control system for a vehicle. The steering and drive system includes a first reversible hydraulic motor for driving a first ground engaging member, such as a wheel, positioned on a first side of the vehicle and a second reversible hydraulic motor for driving a second ground engaging member, such as a wheel, positioned on a second side of the vehicle. The speed and direction of operation of the first hydraulic motor is controlled by a first valve. The speed and direction of operation of the second hydraulic motor is controlled by a second valve.

An actuator shaft is connected with the first and second valves. The actuator shaft is supported for linear movement along its axis. Linear movement of the actuator shaft along its axis actuates both of the valves to either increase or decrease the speed of both of the hydraulic motors. The actuator shaft is also supported for rotation about its axis. Rotation of the actuator shaft about its axis actuates one of the valves in one direction and simultaneously actuates the other valve in the opposite direction.

BRIEF DESCRIPTION OF THE DRAWINGS

The foregoing and other objects and features of the present invention will become more apparent to one skilled in the art upon a consideration of the following description and the accompanying drawings, in which:

FIG. 9 is an illustration depicting actuation of the controls of FIG. 3 to turn the lawn mower to the right by effecting operation of the reversible hydraulic motors in opposite directions;

FIG. 10 is an illustration depicting actuation of the controls of FIG. 3 to turn the lawn mower to the left by effecting operation of the reversible hydraulic motors in opposite directions.

DESCRIPTION OF A PREFERRED EMBODIMENT

Figure 1:
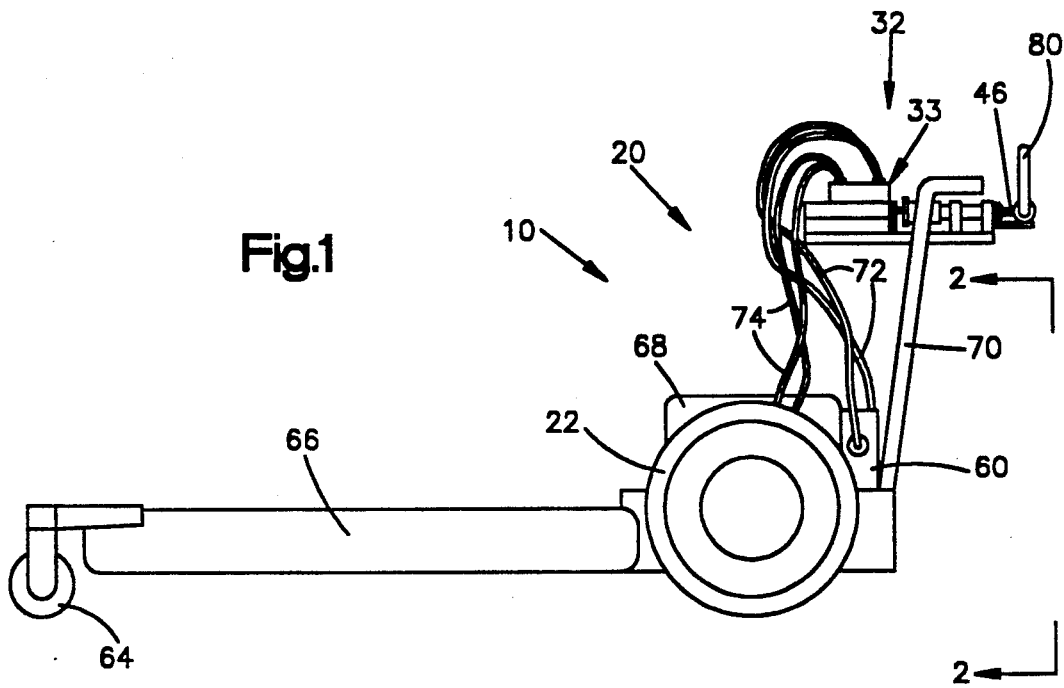
FIG. 1 is a side elevational view of a walk behind lawn mower having a pair of reversible hydraulic motors which are controlled by a steering and drive system constructed in accordance with the present invention.
Figure 2:
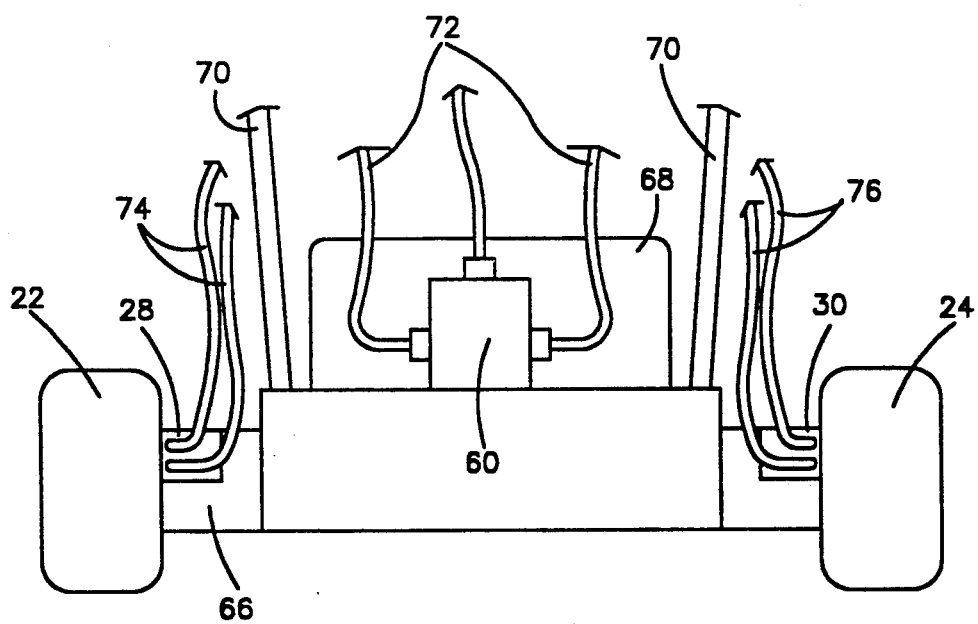
FIG. 2 is a fragmentary rear elevational view, taken generally along the line 2—2 of FIG. 1, illustrating the relationship of the reversible hydraulic motors to drive wheels of the lawn mower.

A vehicle 10 with a steering and driving system 20 of the present invention is shown in FIG. 1. The illustrated vehicle 10 is a walk behind lawn mower. However, the invention is also applicable to a riding mower or the like. The vehicle 10 includes a first or left (as viewed in FIG. 2) wheel 22 on a left side of the lawn mower. The vehicle 10 also includes a second or right (as viewed in FIG. 2) wheel 24 on a right side of the lawn mower. If desired, ground engaging tracks or similar drive devices could be used instead of wheels 22, 24.

A first or left (as viewed in FIG. 2) reversible hydraulic motor 28 is disposed adjacent to the left wheel 22. A second or right (as viewed in FIG. 2) reversible hydraulic motor 30 is disposed adjacent the right wheel 24. The left hydraulic motor 28 drives the left wheel 22 and the right hydraulic motor 30 drives the right wheel 24. Preferably, the motors 28, 30 are "MG Wheel Mount" hydraulic gerotor motors sold by the Ross Gear Division of TRW and having a place of business in Lafayette, Ind. For other applications which may require additional torque capability, the motors could be MB or ME hydraulic gerotor motors sold by The Ross Gear Division of TRW.

Figure 3:
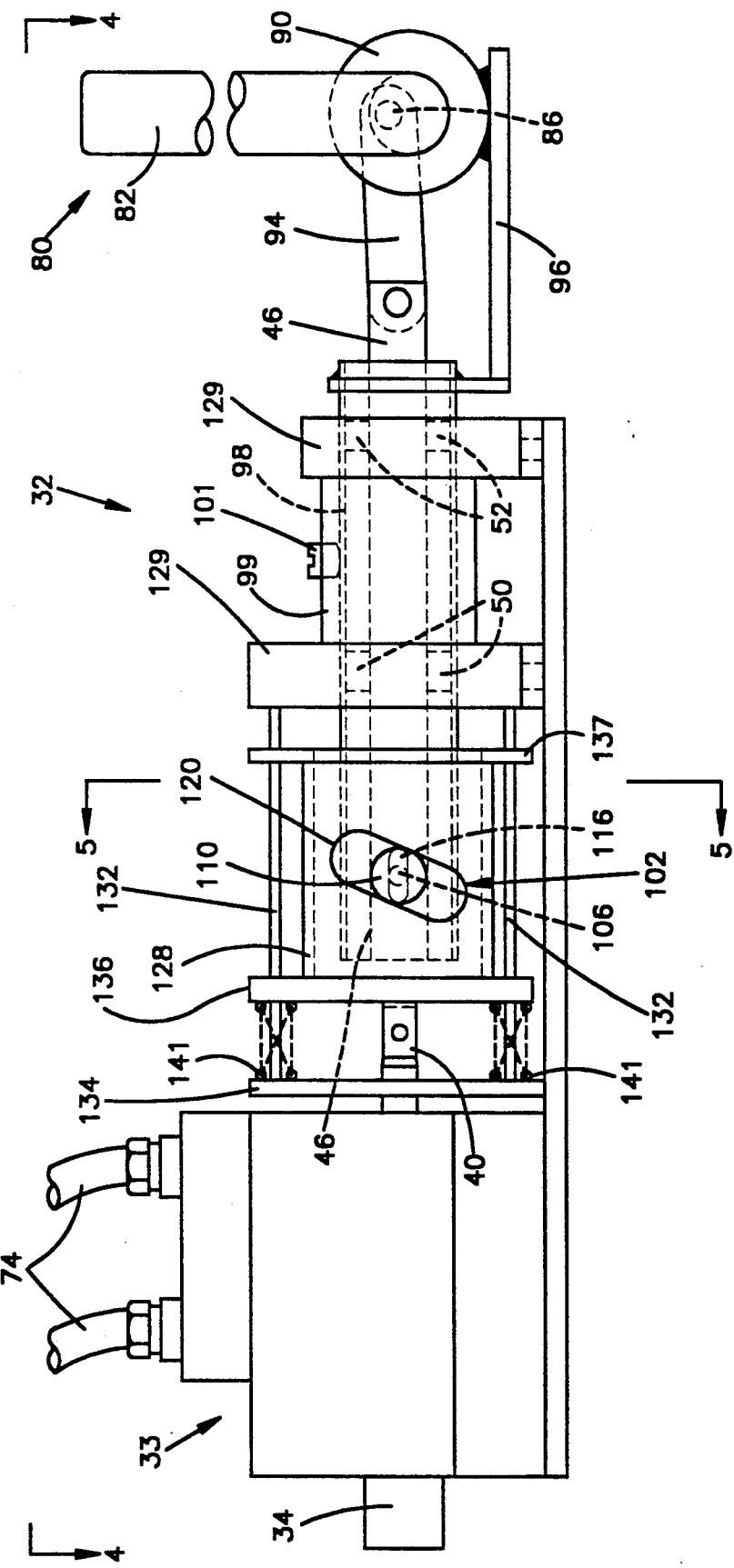
FIG. 3 is an enlarged side elevational view of manually actuatable controls for the reversible hydraulic motors of FIG. 2.

The steering and drive system 20 includes a steering and drive control system 32 (FIG. 3). The steering and drive control system 32 includes a valve assembly 33. The valve assembly 33 includes a first valve 34 which controls the speed and drive direction of the left hydraulic motor 28. A second valve 36 (FIG. 4) controls the speed and drive direction of the right hydraulic motor 30. The valves 34 and 36 are of the well known spool type.

Figure 4:
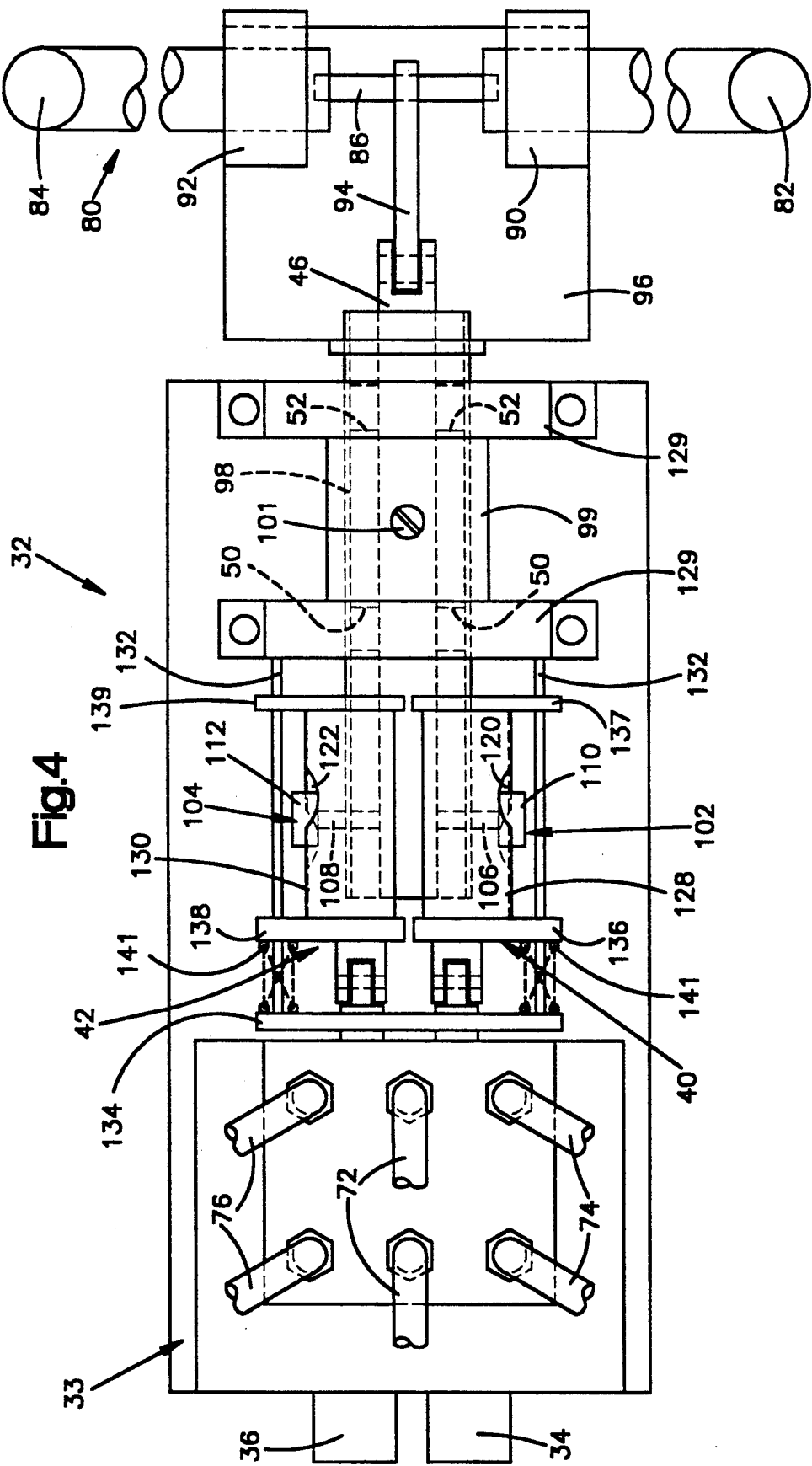
FIG. 4 is a plan view taken along line 4—4 of FIG. 3 further illustrating the manually actuatable controls.
Figure 5:
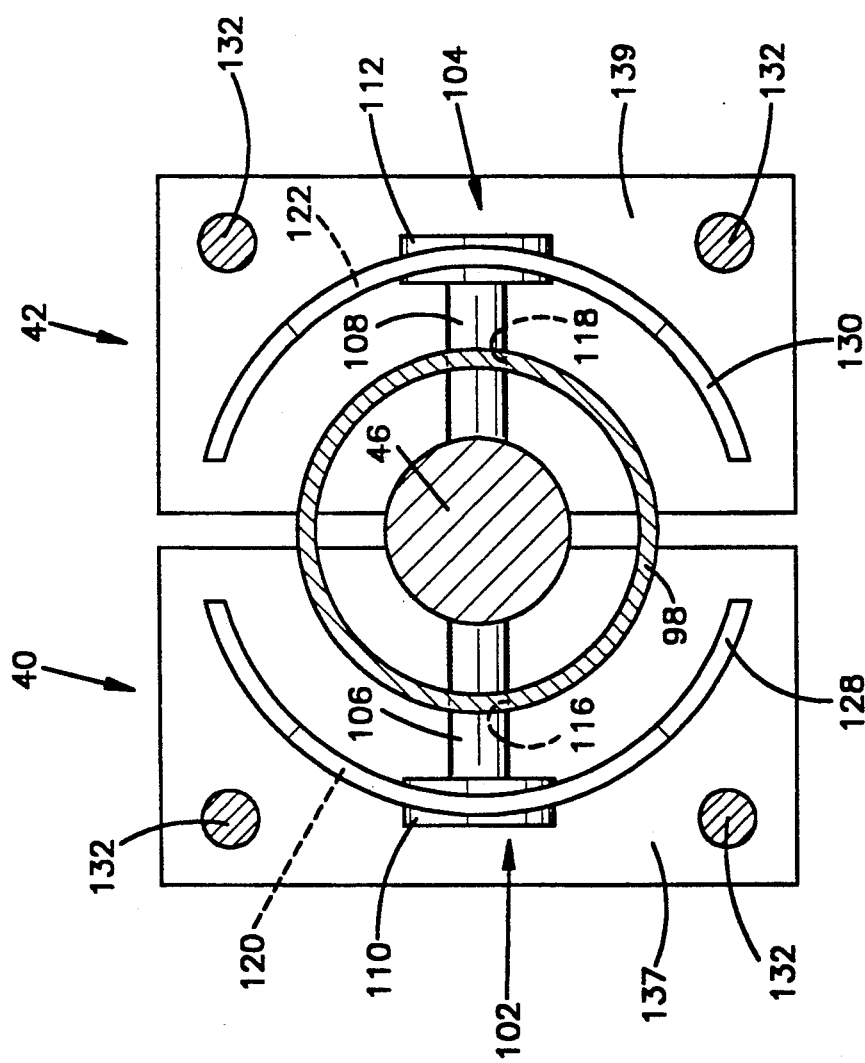
FIG. 5 is a sectional view taken along line 5—5 of FIG. 3, illustrating a connection between an actuator shaft and a valve assembly.
Figure 6:
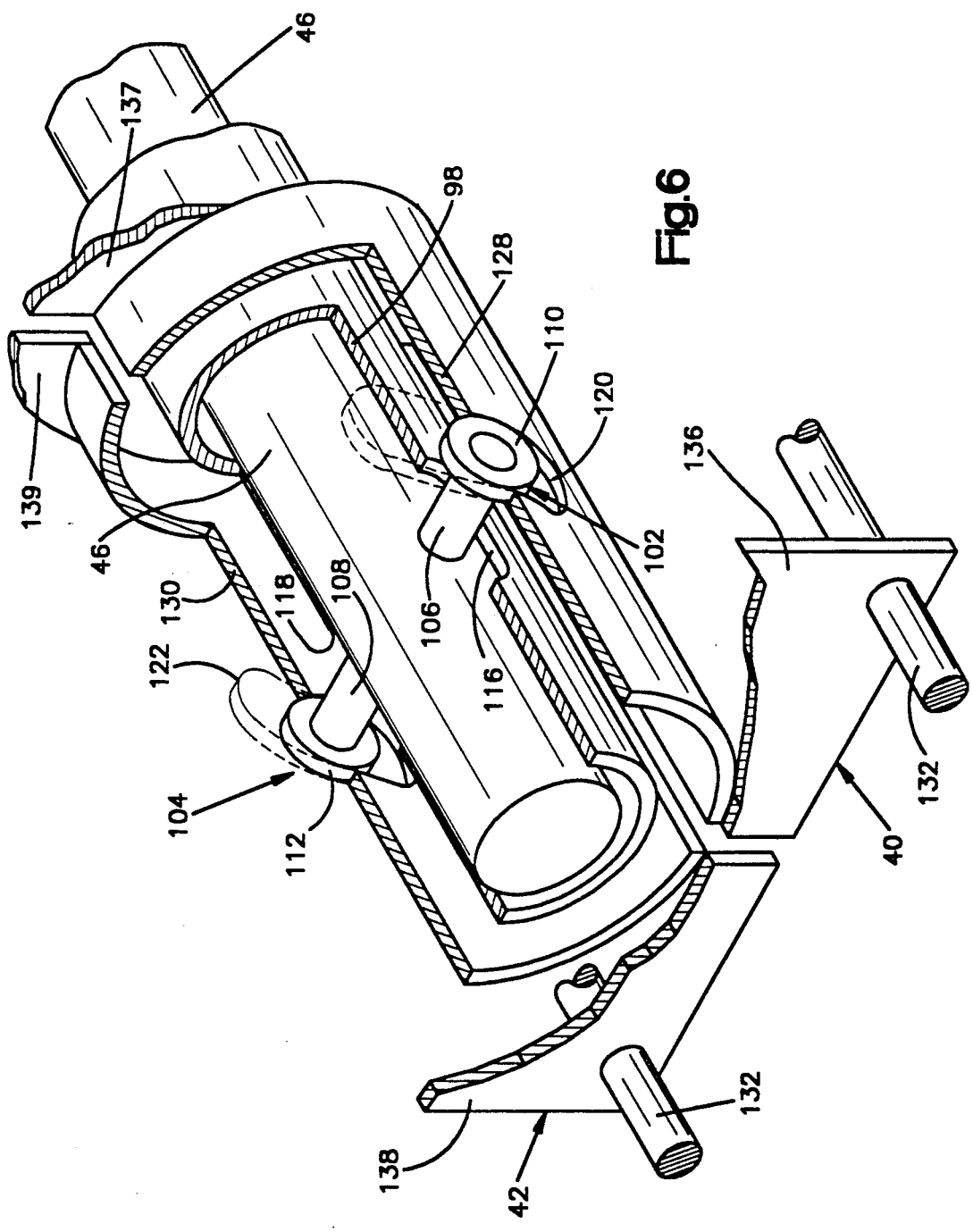
FIG. 6 is a partially broken away fragmentary pictorial illustration further illustrating the connection between the actuator shaft and valve assembly.

The first valve 34 is operable by an actuator member 40. The second valve 36 is operable by an actuator member 42. A cylindrical actuator shaft 46 (FIGS. 4, 5 and 6) is connected to the actuator members 40 and 42 for the first and second valves 34 and 36 (FIG. 4). The actuator shaft 46 is supported for both linear movement along its axis and rotational movement about its axis by bearing blocks 50 and 52.

The actuator shaft 46 is movable linearly along its axis to actuate both valves 34 and 36. Movement of the actuator shaft 46 in a forward direction along its axis (FIG. 7) moves both of the actuator members 40 and 42 in the forward direction. Movement of the actuator shaft 46 in a rearward direction along its axis (FIG. 8) moves both of the actuator members 40 and 42 in the rearward direction.

The cylindrical actuator shaft 46 (FIGS. 3 and 6) is rotatable about its axis in the bearing blocks 50 and 52 (FIG. 3). Rotation of the actuator shaft 46 rightwardly (clockwise as viewed in FIG. 9) about its axis moves the first actuator member 40 in the forward direction and the second actuator member 42 in the reverse direction. Rotation of the actuator shaft 46 leftwardly (counterclockwise as viewed in FIG. 10) about its axis moves the first actuator member 40 in the rearward direction and moves the second actuator member 42 in the forward direction.

A hydraulic pump 60 (FIG. 11) provides a pressurized supply of hydraulic fluid. Movement of the first actuator member 40 causes the first valve 34 to direct hydraulic fluid to the left hydraulic motor 28. Movement of the second actuator member 42 causes the second valve 36 to direct hydraulic fluid to the right hydraulic motor 30.

Movement of the actuator member 40 in a forward direction causes the valve 34 to direct hydraulic fluid to the left hydraulic motor 28 to operate the left motor in a forward direction. Movement of the actuator member 40 in a rearward direction causes the valve 34 to direct hydraulic fluid to the left hydraulic motor 28 to operate the left motor in a reverse direction. Similarly, movement of the second actuator member 42 in the forward direction causes the valve 36 to direct fluid to the right hydraulic motor 30 to operate the motor in a forward direction. Movement of the second actuator member 42 in the rearward direction causes the valve 36 to direct fluid to the right hydraulic motor 30 to operate the motor in a reverse direction.

The first and second valves 34 and 36 are infinitely variable to provide precise adjustment of the flow of hydraulic fluid. The first and second valves 34 and 36 have central neutral positions in which hydraulic fluid flow to the left and right hydraulic motors 28 and 30 is blocked. Increased movement of the valves 34 and 36 from the central neutral positions increases the flow of hydraulic fluid to the left and right hydraulic motors 28 and 30. An increased flow of hydraulic fluid to the left hydraulic motor 28 increases the speed of the left hydraulic motor. Similarly, an increased flow of hydraulic fluid to the right hydraulic motor 30 increases the speed of the right hydraulic motor.

The vehicle 10 (FIGS. 1 and 2) includes a pair of front castor wheels 64 for maneuverability of the vehicle 10. A mower deck 66 is disposed on the vehicle 10 and supports a blade for cutting grass as the vehicle 10 is moved. An engine 68 is disposed on the vehicle 10 to provide power for rotating the cutting blade and also to provide power to drive the hydraulic pump 60. The engine 68 can be any conventional engine, such as an internal combustion engine. A handle bar 70 is disposed on the vehicle 10 for pushing the vehicle 10 when the vehicle 10 is not being driven by the steering and drive system 20.

The steering and drive control system 32 is mounted on the handle bar 70. The steering and drive control system 32 is positioned to be controlled by the hands of an operator walking behind the vehicle 10. If the invention was applied to a riding mower, the steering and drive control system would be controlled by an operator riding the vehicle.

The first and second valves 34 and 36 (FIG. 4) in the steering and drive control system 32 are connected in fluid communication with the hydraulic pump 60 (FIG. 2) by a first pair of hydraulic lines 72. A second pair of hydraulic lines 74 connects the first valve 34 in fluid communication with the left hydraulic motor 28. The second pair of hydraulic lines 74 provides for the supply and return of hydraulic fluid for the left hydraulic motor 28. A third pair of hydraulic lines 76 connects the second valve 36 with the right hydraulic motor 30. The third pair of hydraulic lines 76 provides for the supply and return of hydraulic fluid for the right hydraulic motor 30.

The steering and drive control system 32 (FIGS. 3 and 4) includes a handle 80 which is manually gripped by an operator. The handle 80 includes two upwardly extending arms 82 and 84 (FIG. 7) and a central member 86 extending between the arms 82 and 84. The handle 80 is mounted for pivotal tilting in a pair of bearings 90 and 92.

Figure 7:
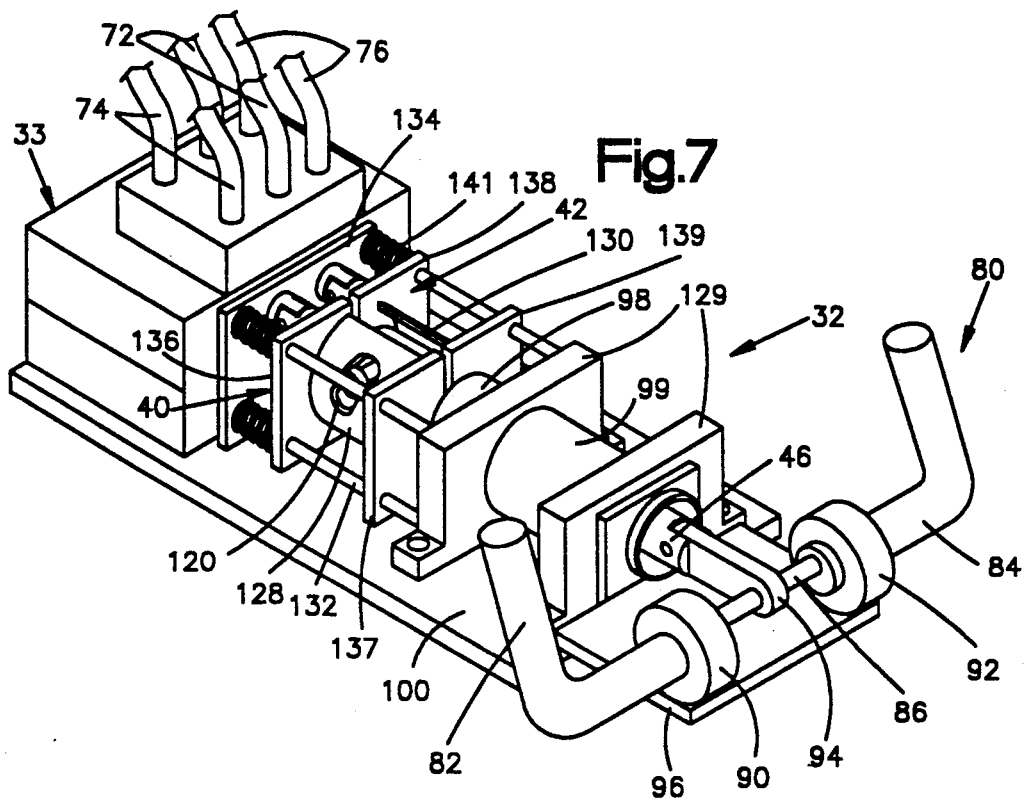
FIG. 7 is a illustration depicting actuation of the controls of FIG. 3 to effect operation of the reversible hydraulic motors in a forward direction at the same speed.
Figure 8:
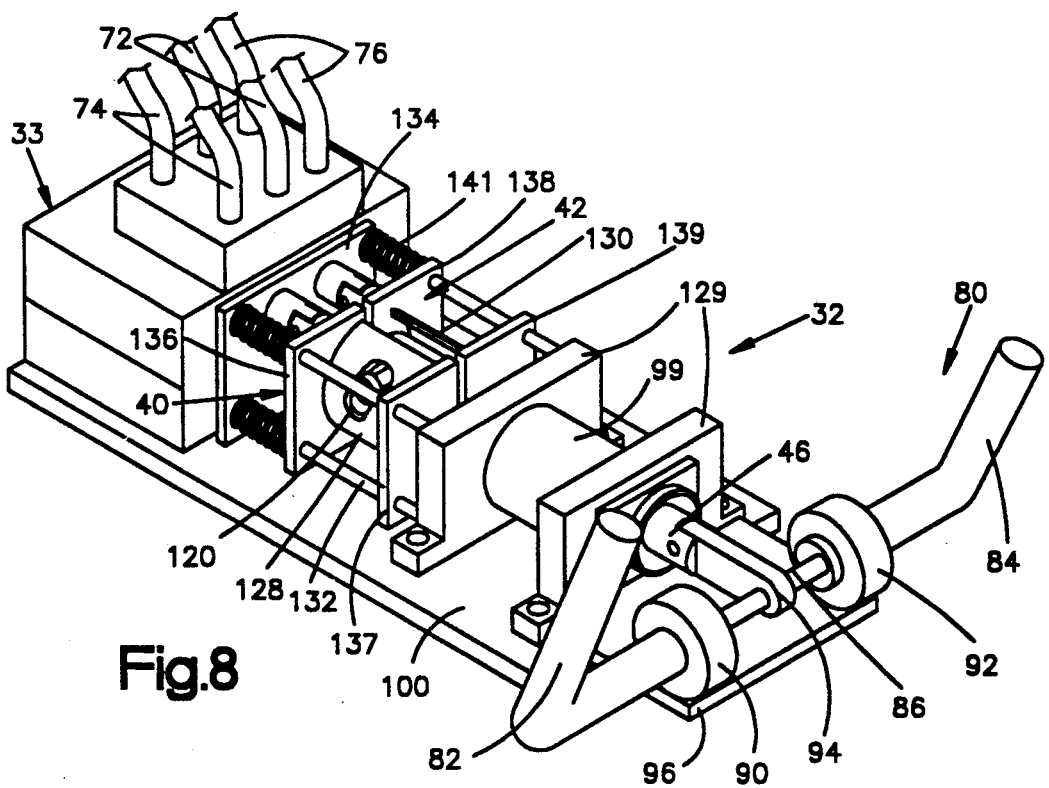
FIG. 8 is an illustration depicting actuation of the controls of FIG. 3 to effect operation of the reversible hydraulic motors in a reverse direction at the same speed.

The actuator shaft 46 is connected to a link 94 (FIGS. 3, 4 and 7). The link 94 is connected to the central member 86. The central axis of the member 86 is offset from the axis about which the handle 80 is rotated or tilted relative to the bearings 90 and 92. Tilting of the handle 80 causes an eccentric movement of the end of the link 94 connected with the central member 86. The eccentric movement of the link 94 moves the actuator shaft 46 linearly along its axis.

The bearings 90 and 92 are mounted on a plate 96 which is rotatable about the central axis of the actuator shaft 46. The plate 96 supports the bearings 90 and 92 and the handle 80. The actuator shaft 46, the plate 96 and the handle 80 are rotatable together.

The plate 96 is connected to a hollow cylindrical jacket tube 98. The jacket tube 98 is supported for rotation by a pair of bearing blocks 129 (FIG. 4). The cylindrical actuator shaft 46 is disposed within and is coaxial with the hollow cylindrical jacket tube 98. The actuator shaft 46 is supported within the jacket tube 98 by the bearings 50 and 52. The jacket tube 98 is held against axial movement by a hollow cylindrical retaining tube 99 which surrounds the jacket tube 98 and is disposed between the bearing blocks 129. A set screw 101 interconnects the jacket tube 98 and a retaining tube 99.

Rotation of the handle 80 (FIGS. 9 and 10) rotates the actuator shaft 46, the rotatable plate 96 and the jacket tube 98 about the central axis of the actuator shaft 46. Tilting of the handle 80 moves the actuator shaft 46 linearly along its axis relative to the cylindrical jacket tube 98.

The actuator shaft 46 and the jacket tube 98 extend to positions adjacent to the first and second actuator members 40 and 42. Two cam assemblies 102 and 104 (FIGS. 4, 5 and 6) are mounted on the actuator shaft 46 adjacent to the end of the actuator shaft 46 opposite from the handle 80. The two cam assemblies 102 and 104 include radially extending rods 106 and 108 which are fixedly connected to the actuator shaft 46.

The rod 106 extends through an axially extending slot 116 (FIG. 6) in the jacket tube 98. The slot 116 extends parallel to the longitudinal axis of the jacket tube 98. The slot 116 permits axial movement of the actuator shaft 46 and the rod 106 relative to the jacket tube 98. The rod 108 extends through an axially extending slot 118 in the jacket tube 98 in a similar manner.

Disposed at the end of rod 106 is a cam roller 110. Disposed at the end of rod 108 is a second cam roller 112. The cam roller 110 engages a cam slot 120 (FIGS. 3 and 6) in the first actuator member 40. The cam roller 112 engages a cam slot 122 (FIG. 6) in the second actuator member 42.

The first and second actuator members 40 and 42 include curved portions 128 and 130 (FIGS. 4 and 6) within which the cam slots 120 and 122 are disposed. The curved portions 128 and 130 are semi-circular in cross sectional configuration and permit the cam slots 120 and 122 to maintain engagement with the cam rollers 110 and 112 upon rotation of the actuator shaft 46. Rotation of the actuator shaft 46 in the jacket tube 98 rotates the cam rollers 110 and 112 about the central axis of the actuator shaft 46. Rotation of the rollers 110 and 112 with the actuator shaft 46 moves the cam rollers 110 and 112 in the cam slots 120 and 122 to cam the first and second actuator members 40 and 42 in opposite directions along the axis of the actuator shaft 46.

The first and second actuator members 40 and 42 (FIGS. 3-6) are held against rotation by a plurality of stationary support rods 132. The support rods 132 prevent rotation of the actuator members 40 and 42 with the actuator shaft 46 while enabling the actuator members 40 and 42 to move along the axis of the actuator shaft 46. Opposite ends of the support rods 132 are connected to a stationary plate 134 and a bearing block 129. The rods 132 extend through plates 136, 137, 138, and 139 at opposite ends of the actuator members 40 and 42.

Tilting of the handle 80 forwardly (FIG. 7), from a neutral position, moves the central member 86 forwardly about the central axis of the bearings 90 and 92 with an eccentric action. This moves the link 94 forwardly. As the link 94 moves forward, the actuator shaft 46 moves forward along its axis relative to the jacket tube 98. The rods 106 and 108 and cam rollers 110 and 112 are moved forward together in the slots 116 and 118 in the jacket tube 98. The cam rollers 110 and 112 move the first and second actuator members 40 and 42 linearly forward against the influence of biasing springs 141.

The first and second actuator members 40 and 42 move the spools of the first and second valves 34 and 36 forward. The first and second valves 40 and 42 direct hydraulic fluid from the pump 60 to the left and right hydraulic motors 28 and 30. The left and right hydraulic motors 28 and 30 drive the wheels 22 and 24 in a forward direction. Increased forward tilting of the handle 80 increases the flow of hydraulic fluid and thus increases the forward speed of the first and second wheels 22 and 24.

Tilting of the handle 80 rearwardly (FIG. 8), from a neutral position, moves the central member 86 rearwardly about the central axis of the bearings 90 and 92 with an eccentric action. This moves the link 94 rearwardly. As the link 94 moves rearward, the actuator shaft 46 moves rearward along its axis relative to the jacket tube 98. The rods 106 and 108 and cam rollers 110 and 112 are moved rearward within the slots 116 and 118 of the jacket tube 98. The cam rollers 110 and 112 move the first and second actuator members 40 and 42 linearly rearward against the influence of biasing springs (not shown) in the valves 34 and 36.

The first and second actuator members 40 and 42 move spools of the first and second valves 34 and 36 rearward. The first and second valves 34 and 36 direct the hydraulic fluid from the pump 60 to the left and right hydraulic motors 28 and 30. The left and right hydraulic motors 28 and 30 drive the wheels 22 and 24 rearward. Increased rearward tilting of the handle 80 increases the flow of hydraulic fluid and thus increases the rearward speed.

Rotation of the handle 80 to the right (FIG. 9) about the axis of the actuator shaft 46 rotates the actuator shaft, the plate 96 and the jacket tube 98 in a clockwise direction about the axis of the actuator shaft. The rods 106 and 108 and cam rollers 110 and 112 (FIG. 6) are also rotated about the axis of the actuator shaft 46 in a clockwise direction.

The cam roller 110 moves upwardly within the cam slot 120 to cam the first actuator member 40 forwardly (FIG. 9). The forward movement of the first actuator arm 40 moves the spool of the valve 34 forwardly. The first valve 34 then directs hydraulic fluid from the pump 60 to the left hydraulic motor 28 to drive the left wheel 22 forwardly.

The cam roller 112 moves downwardly within the cam slot 122 to cam the second actuator member 42 rearwardly (FIG. 9). The second actuator member 42 moves the spool of the second valve 36 rearwardly. The second valve 36 directs hydraulic fluid from the pump 60 to the right hydraulic motor 30 to drive the right wheel 24 rearwardly. The driving of the left wheel 22 forwardly and the right wheel 24 rearwardly causes the vehicle 10 to turn to the right.

Rotation of the handle 80 to the left (FIG. 10) about the axis of the actuator shaft 46 rotates the actuator shaft, the plate 96 and the jacket tube 98 in a counterclockwise direction about the axis of the actuator shaft. The rods 106 and 108 and cam rollers 110 and 112 (FIG. 6) are rotated about the axis of the actuator shaft 46 in a counterclockwise direction.

The cam roller 110 moves downwardly within the cam slot 120 to move the first actuator member 40 rearwardly (FIG. 10). The rearward movement of the first actuator member 40 moves the spool of the valve 34 rearwardly. The first valve 34 then directs hydraulic fluid from the pump 60 to the left hydraulic motor 28 to drive the left wheel 22 rearwardly.

The cam roller 112 move upwardly within the cam slot 122 to move the second actuator member 42 forwardly (FIG. 10). The forward movement of the second actuator member 42 moves the spool of the second valve 36 forwardly. The second valve 36 then directs hydraulic fluid from the pump 60 to the right hydraulic motor 30 to drive the right wheel 24 forwardly. The driving of the left wheel 22 rearwardly and the right wheel 24 forwardly causes the vehicle 10 to turn to the left.

It is contemplated that the plate 96 may be urged to a neutral or central position by suitable biasing springs. The biasing springs (not shown) may be provided between the bottom of the plate 96 and a stationary frame member.

A combination of tilting and rotating of the handle 80 can also be performed. Such a combination of tilting and rotating of the handle 80 effects operation of the motors 28 and 30 to drive both the left and right wheels 22 and 24 in a forward or rearward direction, but at different speeds. This causes the vehicle 10 to perform gradual turns. A combination of tilting and rotating of the handle 80 can also effect drive of the left and right wheels 22 and 24 such that they are driven in different directions and at different relative speeds. This would enable the vehicle 10 to make a variety of maneuvers.

A variable flow control 140 (FIG. 11) is disposed on the pump 60 to increase the pressure of the hydraulic fluid supplied by the pump 60 as resistance to operation of the motors 28 and 30 increases. A pressure feedback system 144 is connected to the variable flow control 140 to transmit operating fluid pressures from the hydraulic motors 28 and 30 to the variable flow control 140. A wheel slippage control system 146 prevents excessive slippage of one of the wheels 22 or 24 relative to the other wheel.

The pressure feedback system 144 includes a first shuttle check valve 150 disposed across the first hydraulic motor 28. A second shuttle check valve 152 is disposed across the second hydraulic motor 30. The first and second shuttle check valves 150 and 152 transmit the operating fluid pressures from the hydraulic motors 28 and 30 to a third shuttle valve 154.

The third shuttle check valve 154 is connected in fluid communication with the variable flow control 140. The higher fluid pressure of the operating fluid pressures of the two hydraulic motors 28 and 30 is transmitted from the shuttle check valve 154 to the variable flow control 140. The variable flow control 140 varies the fluid pressure output of the pump 60. Varying the fluid pressure output of the pump motor 60 maintains the speed selected by the operator constant despite the variations in terrain over which the vehicle 10 is moved or the load which is placed upon the vehicle.

The valve assembly 33 was obtained from Ultra Fluid Technologies. The valve assembly 33 has a very narrow dead band in center position. This enables precise turning maneuvers with negligible interruption between left and right turns, etc. Each spool of the valve assembly 33 is connected in fluid communication with the variable flow control 140. This provides smooth control from a stop to a selected operating speed and provides for pressure compensation of the drive system.

The pump 60 is a load sense controlled gear pump supplied by Ultra Fluid Technologies. The load sensor enables the pump 60 to provide a constant flow of fluid, regardless of system pressure. Therefore, climbing or running down a hill will result in a closely held speed control for the mower. The variable flow control 140 enables the pump 60 to provide fluid which is approximately 150 psi above the demand of the motors 28 and 30.

The wheel slippage control system 146 includes a first slippage control valve 160 through which fluid flow from the pump 60 is conducted to the first valve 34. Fluid from the pump 60 is conducted through the second slippage control valve 162 to the second valve 36. The operating pressure for the motor 28 is conducted from the first shuttle check valve 150 to the first slippage control valve 160 to urge the first slippage control valve 160 to the open condition shown in FIG. 11. A spring 164 biases the first slippage control valve 160 toward the open condition.

Figure 11:
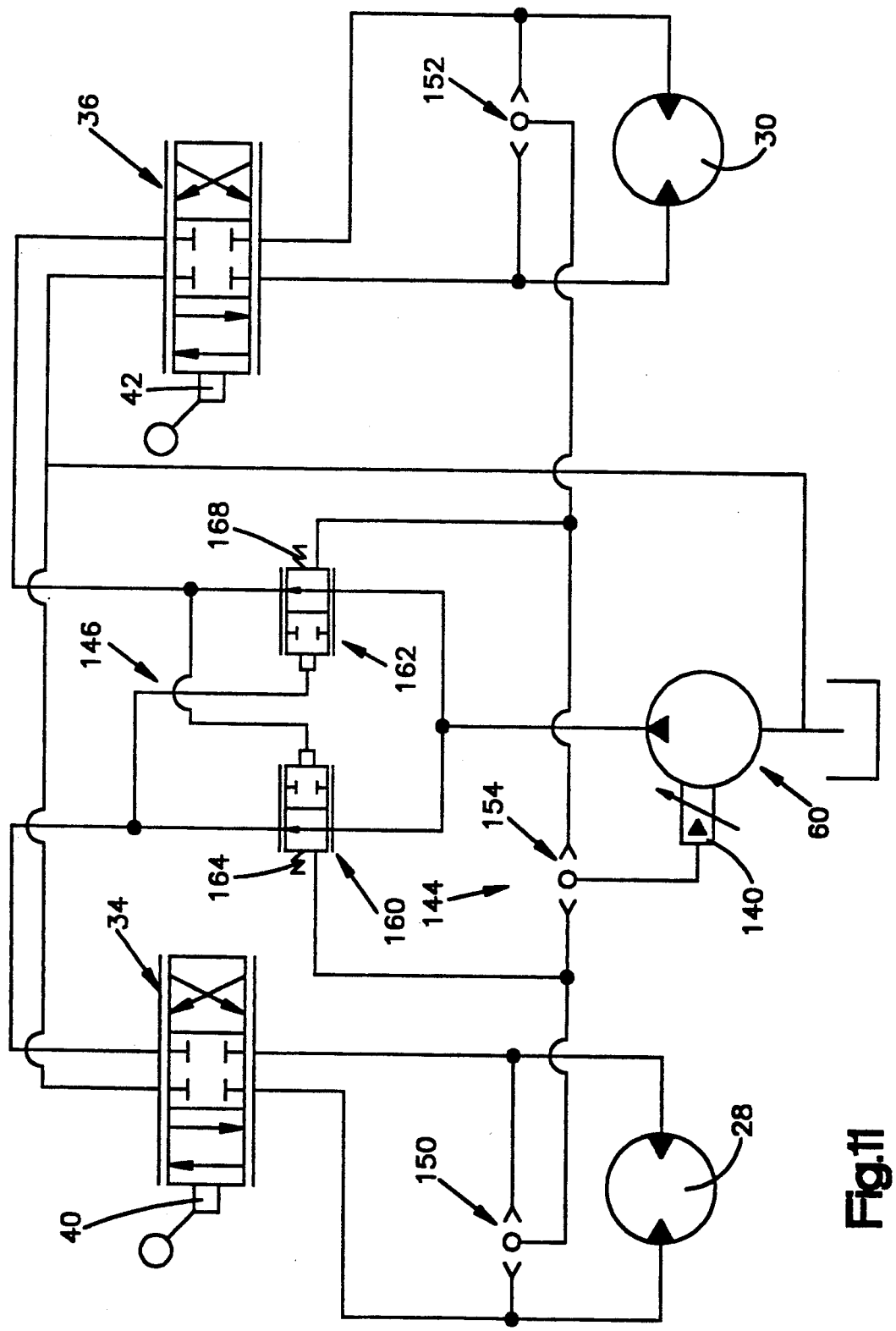
FIG. 11 is a schematic diagram of hydraulic circuitry used in the steering and drive system of FIG. 1.

The second slippage control valve 162 is connected with operating pressure for the motor 30 by the second shuttle check valve 152 to urge the second slippage control valve 162 to the open condition shown in FIG. 11. In addition, a biasing spring 168 urges the second slippage control valve 162 toward the open condition.

The first slippage control valve 160 is urged toward a closed condition by fluid pressure conducted from the pump 60 to the second valve 36. The second slippage control valve 162 is urged toward the closed condition by the fluid pressure conducted from the pump 60 to the second valve 34.

When the wheel 22 encounters a relatively low resistance to rotation, for instance, slippery grass, the operating pressure in the motor 28 decreases. This decrease in operating pressure is conducted from the shuttle check valve 150 to the slippage control valve 160 to enable the higher fluid pressure being conducted from the pump 60 to the second valve 36 to actuate the slippage control valve 160 toward a closed condition to reduce the rate of fluid flow to the motor 28. This reduces the rate of slippage of the wheel 22 relative to the wheel 24.

Similarly, if the wheel 24 encounters relatively low resistance to rotation, the operating pressure of the motor 30 is reduced. This reduced operating pressure is conducted from the shuttle check valve 152 to the slippage control valve 162. When this occurs, the relatively high fluid pressure being conducted from the pump 60 to the first valve 34 is effective to actuate the second slippage control valve 162 toward the closed condition to reduce the rate of fluid flow to the second valve 36 and motor 30 which drives the wheel 24.

It should be understood that the foregoing references to a specific valve assembly 33 and pump 60 have been set forth herein for purposes of clarity of description. It is contemplated that different valve assemblies and/or pumps may be used if desired.

From the above description of the invention, those skilled in the art will perceive improvements, changes and modifications. Such improvements, changes and modifications within the skill of the art are intended to be covered by the appended claims.

Having described the invention, the following is claimed:

1. A steering and driving system for a vehicle having a first wheel on a first side of the vehicle and a second wheel on a second side of the vehicle, said system comprising:
a first reversible hydraulic motor means for driving the first wheel of the vehicle;
a second reversible hydraulic motor means for driving the second wheel of the vehicle;
first valve means for controlling the direction and speed of operation of said first reversible hydraulic motor means;
second valve means for controlling the direction and speed of operation of said second reversible hydraulic motor means;
an actuator shaft;
force transmitting means for moving said actuator shaft along its axis and for rotating said actuator shaft about its axis; and
connector means for connecting said actuator shaft with said first and second valve means;
said connector means being operable by said actuator shaft to actuate said first and second valve means to vary the operating speed of said first and second reversible hydraulic motor means upon movement of said actuator shaft along its axis during operation of said first and second reversible hydraulic motor means in forward and reverse directions;

said connector means being operable by said actuator shaft to actuate said first and second valve means to increase the operating speed of said first reversible hydraulic motor means and decrease the operating speed of said second reversible hydraulic motor means upon rotation of said actuator shaft in a first direction about its axis and to actuate said first and second valve means to decrease the operating speed of said first reversible hydraulic motor means and to increase the operating speed of said second reversible hydraulic motor means upon rotation of said actuator shaft in a second direction about its axis.

2. A steering and drive system as set forth in claim 1 wherein said connector means includes a first connector member connected with said first valve means and having a first cam surface, a second connector member connected with said second valve means and having a second cam surface, a first cam follower connected with said actuator shaft and disposed in engagement with said first cam surface, and a second cam follower connected with said actuator shaft and disposed in engagement with said second cam surface, said first and second cam followers being movable with said actuator shaft along it axis to move said first and second connector members with said actuator shaft under the influence of force transmitted from said actuator shaft to said first and second ca surfaces by said first and second cam followers, said first and second cam followers being rotatable with said actuator member about its axis to move one of said connector members in one direction relative to said actuator shaft and to move the other of said connector members in a direction opposite to the one direction under the influence of force transmitted from said actuator shaft to said first and second cam surfaces by said first and second cam followers.

3. A system as set forth in claim 1 wherein said actuator means includes a manually movable member connected with said actuator shaft, said manually movable member being movable in one direction to move said actuator shaft in a first direction along its axis and actuate said first and second valve means to increase the speed of operation of said first and second reversible hydraulic motor means during operation of said first and second reversible hydraulic motor means in a forward direction and to decrease the speed of operation of said first and second reversible hydraulic motor means during operation of said first and second reversible hydraulic motor means in a reverse direction, said manually movable member being movable in another direction opposite to the one direction to move said actuator shaft in a second direction along its axis and actuate said first and second valve means to decrease the speed of operation of said first and second reversible hydraulic motor means during operation of said first and second reversible hydraulic motor means in a forward direction and to increase the speed of operation of said first and second reversible hydraulic motor means during operation of said first and second hydraulic motor means in a reverse direction.

4. A system as set forth in claim 3 wherein said manually movable member is rotatable in one direction about a control axis to rotate said actuator member in a first direction about its axis and actuate said first and second valve means to operate said first reversible hydraulic motor means in the forward direction and said second reversible hydraulic motor means in the reverse direction, said manually movable member being rotatable about the control axis in another direction opposite to the one direction of rotation to rotate said actuator member in a second direction about its axis and actuate said first and second valve means to operate said first reversible hydraulic motor means in the reverse direction and said second reversible hydraulic motor means in the forward direction.

5. A system as set forth in claim 1 wherein said force transmitting means includes handle means, said handle means being tiltable to move said actuator shaft along its axis and said handle means being rotatable to rotate said actuator shaft about its axis.

6. A system as set forth in claim 1 wherein said connector means includes a first connector member connected with said first valve means, a second connector member connected with said second valve means, and means for moving said first and second connector members together with said actuator shaft upon movement of said actuator shaft along its axis and for moving said first and second connector members in opposite directions upon rotation of said actuator shaft about its axis.

7. A system as set forth in claim 1, including means for reducing the driving force of one of said first and second hydraulic motors to prevent slippage of the first and second wheels, said means for reducing the driving force including third valve means for restricting a flow of hydraulic fluid from a fluid supply toward one of said first and second valve means.

8. A system as set forth in claim 7, wherein said means for reducing the driving force includes a spring means for biasing said third valve means toward a neutral position in which the third valve means provides a minimal restriction, said means for reducing the driving force includes means for controlling said third valve means responsive to a pressure of hydraulic fluid from the fluid supply toward the other of said first and second valve means.

9. A system as set forth in claim 1, including a means for supplying pressurized hydraulic fluid for operating said first and second hydraulic motor means, said means for supplying pressurized hydraulic fluid includes means for varying supply of the hydraulic fluid responsive to operating conditions of said first and second hydraulic motor means.

10. A system for steering and driving a vehicle having a first vehicle driving member on a first side of the vehicle and a second vehicle driving member on a second side of the vehicle, said system comprising:
   first hydraulic motor means for driving the first vehicle driving member;
   second hydraulic motor means for driving the second vehicle driving member; and
   control means for controlling the speed of operation of said first and second hydraulic motor means, said control means including
   an actuator shaft,
   means for supporting said actuator shaft for linear movement and for rotational movement,
   means for (a) linearly moving said actuator shaft to simultaneously increase the speed of operation of said first and second hydraulic motor means, and (b) rotating said actuator shaft to vary the speed of operation of one of said hydraulic motor means relative to the speed of operation of the other hydraulic motor means, first valve means for controlling a rate of fluid flow from a source to said first hydraulic motor means, said first valve means including a first valve member which is movable along a first linear path away from a first initial position to increase the rate of fluid flow to said first hydraulic motor means and is movable along eh first linear path toward the first initial position to decrease the rate of fluid flow to said first hydraulic motor means;

second valve means for controlling a rate of fluid flow from the source to said second hydraulic motor means, said second valve means including a second valve member which is movable along a second linear path away from a second initial position to increase the rate of fluid flow to said second hydraulic motor means and is movable along the second linear path toward the second initial position to decrease the rate of fluid flow to said second hydraulic motor means; and force transmitting means interconnecting said actuator shaft and said first and second valve members for moving said first and second valve members along the first and second linear paths in response to linear movement of said actuator shaft, said force transmitting means including means for moving at least one of said first and second valve members along the first or second linear path in response to rotation of said actuator shaft.

11. A system for steering and driving a vehicle having a first vehicle driving member on a first side of the vehicle and a second vehicle driving member on a second side of the vehicle, said system comprising:

first hydraulic motor means for driving the first vehicle driving member;

second hydraulic motor means for driving the second vehicle driving member; and control means for controlling the speed of operation of said first and second hydraulic motor means, said control means including an actuator shaft, means for supporting said actuator shaft for linear movement along an axis and rotational movement about the axis, first and second valve means for variably directing hydraulic fluid flow from a fluid source toward said first and second motor means, respectively, to cause operating speed changes in said first and second hydraulic motor means, connection means for transmitting force from said actuator shaft to said first and second valve means including first, second and third portions, said first portion being attached to said first valve means, said second portion being attached to said second valve means, said third portion being attached to said actuator shaft, said third portion moving linearly upon linear movement of said actuator shaft and rotationally about the axis with said actuator shaft upon rotational movement of said actuator shaft, said first, second and third portions each have engaging surface means for moving said first and second portions in first operational directions upon movement of said actuator shaft in a first linear direction, for moving said first portion in its first operational direction and moving said second portion in a second operational direction upon movement of said actuator shaft in a first rotational direction and for moving said first portion in a second operational direction and moving said second portion in its first operational direction upon movement of said actuator shaft in a second rotational direction.

12. A system as set forth in claim 11, wherein said third portion of said connection means includes a pair of cam assemblies which extend radially from said actuator shaft.

13. A system as set forth in claim 12, wherein said engaging surface means on said first and second portions of said connection means define a cam slot on each of said first and second portions, each of said cam assemblies extends to engage one of said cam slots.

14. A system as set forth in claim 13 wherein each of said cam assemblies is moved along a longitudinal extent of one of said cam grooves upon rotation of said actuator shaft to move said first and second portions of said connection means axially relative to said actuator shaft.

15. A system as set forth in claim 13, wherein each of said cam assemblies includes an axially extending rod and a cam roller mounted for rotation on said rod, outer surfaces of said cam rollers being said engaging surface means of said third portion.

16. A system as set forth in claim 11, wherein said control means includes spring means connected to said first and second portions of said connection means to bias said first and second portions to neutral positions.

* * * * *

UNITED STATES PATENT AND TRADEMARK OFFICE
CERTIFICATE OF CORRECTION

PATENT NO. : 5,181,579
DATED : January 26, 1993
INVENTOR(S) : Donald L. Gilliem

It is certified that error appears in the above-indentified patent and that said Letters Patent is hereby corrected as shown below:

Column 9, line 33, change "ca" to --cam--.

Column 11, line 9, change "eh" to --the--.

Signed and Sealed this

Eighth Day of March, 1994

Attest:

BRUCE LEHMAN

Attesting Officer     Commissioner of Patents and Trademarks